US012730767B2

(12) United States Patent
Wortberg

(10) Patent No.: US 12,730,767 B2
(45) Date of Patent: Sep. 8, 2026

(54) CONTROL ARRANGEMENT FOR A VEHICLE ELECTRICAL SYSTEM

(71) Applicant: Lisa Dräxlmaier GmbH, Vilsbiburg (DE)

(72) Inventor: Michael Wortberg, Dorfen (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 124 days.

(21) Appl. No.: 18/763,421

(22) Filed: Jul. 3, 2024

(65) Prior Publication Data

US 2024/0414023 A1 Dec. 12, 2024

Related U.S. Application Data

(63) Continuation of application No. PCT/EP2022/085884, filed on Dec. 14, 2022.

(30) Foreign Application Priority Data

Jan. 4, 2022 (DE) ..................... 10 2022 100 107.5

(51) Int. Cl.
*G06F 13/20* (2006.01)
*G06F 13/42* (2006.01)

(52) U.S. Cl.
CPC .......... *G06F 13/20* (2013.01); *G06F 13/4282* (2013.01)

(58) Field of Classification Search
CPC ............................. G06F 13/20; G06F 13/4282
See application file for complete search history.

(56) References Cited

U.S. PATENT DOCUMENTS 5,508,689 A 4/1996 Rado et al.
10,467,154 B2 * 11/2019 Mishra ................. G06F 13/126
(Continued)

FOREIGN PATENT DOCUMENTS

WO 2013053978 A1 4/2013

OTHER PUBLICATIONS

Wikipedia, Funktionale Sicherheit, Aug. 24, 2022, 3 pages, available at https://de.wikipedia.org/w/index.php?title=Funktionale_Sicherheit&oldid=208408124.
(Continued)

*Primary Examiner* — Henry Tsai
*Assistant Examiner* — Christopher A Daley
(74) *Attorney, Agent, or Firm* — Burris Law, PLLC

(57) ABSTRACT

A control arrangement for a vehicle electrical system includes a central control unit and a plurality of decentralized input-output entities connected with the central control unit via a serial communication bus. Each input-output entity includes: a plurality of configurable input-output pins that are associated with at least one sensor and/or at least one actuator; an input-output interface; and a peripheral I/O storage for the storing of a configuration and of physical states of the plurality of configurable input-output pins. The input-output interface generates a sensor record in the peripheral I/O storage based on a physical state of one of the input-output pins associated with the sensor. The input-output interface controls a physical state of an input-output pin, associated with the actuator, corresponding to an actuator entry, present in the peripheral I/O storage. The central computing platform reads the sensor record, and/or writes the actuator record, via the serial communications bus.

12 Claims, 5 Drawing Sheets

(56) References Cited

U.S. PATENT DOCUMENTS

| | | | | |
|---|---|---|---|---|
| 11,743,155 | B2 * | 8/2023 | Lessmann | H04L 43/065 709/224 |
| 11,880,314 | B1 * | 1/2024 | Moschopoulos | G06F 1/3296 |
| 2003/0005154 | A1 | 1/2003 | Thurman | |
| 2015/0347345 | A1 | 12/2015 | Hellriegel et al. | |
| 2019/0129881 | A1 * | 5/2019 | Wietfeldt | G06F 9/542 |
| 2021/0116246 | A1 * | 4/2021 | Paniccia | G01C 19/728 |
| 2022/0107912 | A1 * | 4/2022 | Wietfeldt | G06F 13/4282 |
| 2022/0126637 | A1 * | 4/2022 | Kahlbaum | H01R 13/6658 |

OTHER PUBLICATIONS

Wikipedia, Direct memory access, Aug. 24, 2022, 9 pages, available at https://en.wikipedia.org/w/index.php?title=Direct_memory_access&oldid=1060458041.

International Search Report for PCT/EP2022/085884 mailed Mar. 16, 2023.

* cited by examiner

CONTROL ARRANGEMENT FOR A VEHICLE ELECTRICAL SYSTEM

CROSS-REFERENCE TO RELATED APPLICATIONS

This application is a continuation of International Application No. PCT/EP2022/085884, filed on Dec. 14, 2022, which claims priority to and the benefit of DE 10 2022 100 107.5 filed on Jan. 4, 2022. The disclosure of each of the above referenced applications is incorporated herein by reference.

FIELD

The present disclosure relates to a control arrangement for a vehicle electrical system, and a method for the controlling of sensors and actuators in a vehicle electrical system.

BACKGROUND

The statements in this section merely provide background information related to the present disclosure and may not constitute prior art.

With the steadily increasing number of electrical functions in the electrical system, the complexity of interconnectedness assumes such dimensions that new electrical system architectures must be introduced. The basic idea here is that functions should be zonally integrated, thus resulting in a reduction in complexity. However, some functions in the vehicle are not zonal in nature. Examples of this are the car access system, airbag, and the autonomous driving functions, which are each centrally networked with central control units for the respective function. For example, a zonal control unit receiving a sensor signal front left, communicating it via a bus system to a rear zonal control unit, and this control unit initiating an actuator signal there, is not possible, at least for (real-time) control systems that desire low latency times.

SUMMARY

This section provides a general summary of the disclosure and is not a comprehensive disclosure of its full scope or all of its features.

The present disclosure provides a vehicle electrical system.

The present disclosure relates to remote GPIO ("General Purpose Input Output") modules for new electrical system architectures with virtualized controlling.

The present disclosure provides an electrical system architecture with low complexity, in which the controlling of the components, such as the actuators and sensors provided in the vehicle, can be affected with the shortest possible latency time.

The present disclosure provides a new control arrangement for a vehicle electrical system. In the new control arrangement, the GPIO is relocated in remote GPIO modules, which function as peripheral input-output entities. These are connected via a peripheral component interconnect bus to a central computing platform. The remote GPIOs can be distributed throughout the entire vehicle. Quasi-virtual control units can thus be distributed throughout the entire vehicle. Due to the latency, in the nanosecond range, of the peripheral component interface bus, sensors that are disposed, for example, front left (via remote GPIO front left) can thus be integrated with actuators that are disposed, for example, in the rear (via remote GPIO rear) as if they were processed via a central domain control unit (with many long line connections).

The processing of the functions is affected on a performance microprocessor platform (not a microcontroller). Microprocessors include no GPIO in the form of configurable input or output pins (binary, ADC, PWM, TX, RX, UART, SPI). Here it can also be a SOC (system on chip) multiprocessor platform that to date is typically used for ADAS (advanced driver assistance systems) applications. For this purpose, two different operating systems can be runnable, via a hypervisor, on the multiprocessor platform. For this purpose, in addition to a POSIX operating system for the ADAS application, a RTOS (real-time operating system) operating system is implemented for the control tasks (via remote GPIO).

In a new GPIO ASIC, a mapping is affected by the peripheral component interconnect bus data packets to the general purpose I/O pin of the remote GPIO module. The GPIO ASIC sets the outputs and reads the inputs. The I/O information is reproduced in a storage table of the GPIO ASIC (peripheral I/O state-table or peripheral I/O state table). This storage table is cyclically updated by the central computing platform via the bus by direct memory access mechanisms or memory-mapped I/O. The ASIC of the GPIO module reduces the use of software implemented on the input-output entity. The software (SW), including drivers, is implemented on the SOC processor of the central computing platform.

The new control arrangement comprises a central computing platform and a plurality of decentralized input-output entities corresponding to the remote GPIO modules.

The remote GPIO can replace previous (intelligent) power distributors and combine them with the I/O circuitry from control units. The classical power distributors can thus be omitted.

One advantage of the new control arrangement is in particular as follows: centrally networked functions are the cause of intermeshing in the electrical system. Until now, this has inhibited automatability in wiring harness manufacturing. In contrast, as presented here, distributed GPIOs, which can simultaneously function as current distributors, reduce intermeshing.

According to a first aspect of the present disclosure a control arrangement for a vehicle electrical system is provided, in which the control arrangement comprises a central computing platform and a plurality of decentralized input-output entities that are connected with the central computing platform via a serial communications bus, in which each input-output entity comprises the following: a plurality of configurable input-output pins that are associated with at least one sensor and/or at least one actuator; an input-output interface; and a configuration storage for the storing of a configuration and of physical states of the plurality of configurable input-output pins, in which the input-output interface is configured to generate a sensor record in the peripheral I/O storage based on a physical state of an input-output pin associated with the at least one sensor, in which the input-output interface is further configured to control a physical state of an input-output pin, associated with the at least one actuator, in a manner corresponding to an actuator record, present in the peripheral I/O storage, for the at least one actuator, in which the central computing platform is configured to read out, via the serial communication bus, the sensor record in the peripheral I/O storage of the respective input-output entity, and/or to write, via the serial communication bus, the actuator record in the peripheral I/O storage of the respective input-output entity.

Such a control arrangement offers the technical advantage that the central computing platform and the individual decentralized input-output entities, or remote I/O modules, can be flexibly applied at various locations in the vehicle, and can reduce or even completely eliminate an intermeshing in the electrical system.

The electrical system can thus be constructed with lower or even no intermeshing at all, which enables automated wiring harness manufacturing.

Here the input-output entities can simultaneously function as power distributors and greatly simplify the complexity of the electrical system.

At the same time, a very low latency time, i.e., in the nanosecond range, can be provided in the communication between the various electrical system components, so that the electrical system meets the real-time control standards made by autonomous driving and other applications.

The decentralized input-output entities can function as virtual control units that are distributed throughout the entire vehicle.

According to one example of the control arrangement, the central computing platform includes a DMA (direct-memory-access)-interface for direct storage access on the respective input-output entity.

There are two possibilities for the I/O-access concept:

The first I/O access concept is port-mapped I/O. Drivers or other software on the central computing platform can read or write the I/O contents of the peripheral I/O state tables via access commands. There is thus direct access to the storage of the input-output entities by the SW of the central computing platform.

The second I/O access concept is memory-mapped I/O. In the storage of the central computing platform, a region is identified for I/O and its controlling (central I/O state table). Drivers or other SW on the computing platform can thus read or write the I/O contents via simple memory access. The central I/O state table is a mirror of the peripheral state tables of the distributed input-output entities with GPIO functionality. The comparison of the central state table with the peripheral state tables is affected cyclically (in the nanosecond range).

The technical advantage is thereby achieved that the central computing platform can directly access the states of the I/O state tables of the decentralized input-output entities, so that a virtual control concept is realizable.

According to one example of the control arrangement, the central computing platform includes a central I/O storage that is configured to store sensor records and actuator records of the peripheral I/O state table of the plurality of decentralized input-output entities; here, the central computing platform is configured to compare the central I/O state table with the peripheral I/O state tables of the plurality of decentralized input-output entities via a serial point-to-point interface and direct storage-access mechanisms.

This achieves the technical advantage that the peripheral I/O state table of the decentralized input-output entities can be mirrored in the central I/O storage, so that the same data are present in the decentralized input-output entities and the central computing platform.

According to one example of the control arrangement, the serial point-to-point communication is produced via a peripheral component interconnect bus. This peripheral component interconnect bus can be PCI express, or, for example, a modified USB bus or another suitable bus.

In contrast to existing high-performance buses like Ethernet TCP/IP, this peripheral component interconnect bus is not a bus for the addressed, high-level exchange of message packets between CPUs, but rather a serial interface for the point-to-point connection between a central computing unit and peripheral GPIO devices in order to establish a direct storage access.

With the use of the PCI express bus, the technical advantage is achieved that this is standardized and can thus be easily and cost-effectively used in the wiring system.

PCI Express ("Peripheral Component Interconnect Express," abbreviated PCIe) is a standard for connecting peripheral devices with the chipset of a main processor, which can be efficiently used here in order to connect the decentralized input-output entities with the central computing platform.

According to one example of the control arrangement, the plurality of decentralized input-output entities are connected with the central control unit via an unshielded twisted-pair cable, or via two shielded twisted-pair cables.

The technical advantage is thereby achieved that the connection between a central computing platform and decentralized input-output entities can be realized. Using the twisted-pair cable, the decentralized input-output entities that are located in any location in the vehicle can be easily and flexibly connected with the central control unit.

According to one example of the control arrangement, the input-output interface is configured to cyclically transfer storage states of the actuator records present in the peripheral I/O state tables to the physical states of the input-output pins corresponding to the actuator records.

This achieves the technical advantage that the states according to the peripheral I/O state table are cyclically compared with the input-output pins that control the actuators. The latency time for the controlling of the actuators is thus particularly short.

According to one example of the control arrangement, the plurality of configurable input-output pins (GIPO pins) are configurable as binary inputs/outputs, ADC ("analog-digital converter") inputs, DAC ("digital-analog converter") outputs, SPI ("serial peripheral interface") inputs/outputs, and/or RX/TX ("receive/send") inputs/outputs. Here the configuration of each individual pin is established by a record in the peripheral configuration storage of the decentralized input-output entity.

The technical advantage is thereby achieved that via the input-output pins, the widest variety of states of the actuators and/or sensors can be configured, and thus controlled or read.

According to one example of the control arrangement, the input-output interface is configured to convert the sensor data recorded by the input-output pin associated with the at least one sensor into a digital value, and to store the digital value as a sensor record in the peripheral I/O storage.

The technical advantage is thereby achieved that the analog values recorded by the sensors, for example current or voltage, can be directly applied at the input-output pins, and the conversion into digital values effected via A/D converters that are located in the decentralized input-output entity, in particular the input-output interface. The sensors can thus be constructed simply and may not comprise an A/D converter that converts the sensor signals into digital sensor data.

The decentralized input-output entities or GPIO modules can contain an ASIC that contains the peripheral I/O state table, the configuration storage, and the GPIO for the converting into physical signals, as well as the serial interface, and can be located in the vicinity of the sensor or even integrated into the sensor, so that the construction of the electrical system is greatly simplified. Input/output circuit parts such as smartFETs, half bridges, high-side drivers, CAN transceivers, LIN transceivers, and sensors can be connected to the GPIO of the ASIC. The circuitry of the decentralized input-output entity in this sense resembles that of classical body controllers, but without processor and separate software. The processing power for (a plurality of) input-output entities is provided on the central computing platform.

According to one example of the control arrangement, the input-output interface is configured, according to the record in the configuration storage, to maintain a dedicated pin as binary output pin. The state (1 on/0 off) present in the peripheral I/O storage is translated into a physical state (3.2V on, 0V off) in the GPIO of the ASIC. With the physical signal, a smartFET component for example, as part of the circuitry of the input-output entity, is connected through, and thus the actuator is activated.

The decentralized input-output entities can be located in the vicinity of the actuator, or the GPIO ASIC can even be integrated into the actuator, so that the construction of the wiring system is simplified.

According to one example of the control arrangement, the configuration storage or the peripheral I/O storage further comprises a storage region in which prescribed actuator records for the controlling of a safe state of the at least one actuator are stored.

The technical advantage is thereby achieved that in the event of an interruption in communication with the central computing platform, the actuators can be put into a safe or an alternate state.

According to one example of the control arrangement, the input-output interface is configured such that in the event of an interruption in the connection to the central computing platform, it will configure, based on the prescribed actuator records in the configuration storage or peripheral I/O storage, a physical state of the input-output pin associated with the at least one actuator, which transfers the at least one actuator into a safe state.

The achieves the technical advantage that in the event of an interruption of communication with the central computing platform, as described above, the actuators can be put into a safe or an alternate state. Safety standards of functional safety (FuSi) in the vehicle can thereby be met. In this way, the control arrangement can fulfill the safety standards established for the wiring system architecture, for example for autonomous driving applications.

According to one example of the control arrangement, the input-output interface is configured to connect at least one of the input-output pins associated with the at least one actuator, and/or at least one of the input-output pins associated with the at least one sensor, to a battery terminal in order to supply the at least one actuator and/or the at least one sensor with power.

The technical advantage is thereby achieved that the decentralized input-output entities are simultaneously configured to supply the actuators and sensors in the vehicle with power, so that the power distributors or intelligent power distributors provided in the vehicle until now can be omitted. The complexity of the electrical system is thereby reduced, and costs can be saved.

According to one example of the control arrangement, the central computing platform is configured to repeatedly transfer the actuator record for the prescribed actuator to the corresponding input-output entity and to store it at multiple storage locations of the configuration storage of the corresponding input-output entity; and the input-output interface is designed to configure the input-output pin associated with the prescribed actuator based on a majority decision about the actuator records stored at the multiple storage locations.

This achieves the technical advantage that signal transmission takes place in such a way that errors in data transmission can be corrected. This is suited, in one example, for the transmission of signals which must not occur during normal vehicle operation, for example, the signals that trigger the airbag.

According to one example of the control arrangement, the input-output interface is configured to control the input-output pin associated with the assigned actuator based on the identical actuator record present in the majority of the multiple storage locations.

This results in a signal with the safeguards desired to meet the demands for the vehicle.

According to one example of the control arrangement, a first input-output entity and a sensor associated with a first input-output entity are disposed in a front part of the vehicle; and a second input-output entity and an actuator associated with the second input-output entity are disposed in a rear part of the vehicle.

The technical advantage is thereby achieved that a virtual control architecture can be implemented. Here the sensors and actuators in the vehicle can be controlled by the input-output entities without the functionality of a dedicated control unit for this purpose at the location of the respective component. The central computing platform, together with a plurality of input-output entities, acts as a virtual control unit that is extended over the entire geometry of the vehicle and can maintain local input-output interfaces everywhere with reduced line lengths for the connecting of sensors/actuators. The software-side operation of a variety of functions is affected here on the central computing platform.

According to one example of the control arrangement, the central computing platform is configured to transmit the sensor record and/or the actuator record using a communication protocol that includes error correction in a second communication layer.

The technical advantage is thereby achieved that with error correction in the second communication layer, the latency time of the transmission is reduced, but the standards for functional safety can simultaneously be maintained.

According to a second aspect of the present disclosure a method for the controlling of sensors and actuators in a vehicle electrical system with a control arrangement is provided, in which the control arrangement comprises a central computing platform and a plurality of decentralized input-output entities that are connected with the central computing platform via a serial communication bus, in which each input-output entity comprises the following: a plurality of configurable input-output pins that are associated with at least one sensor and/or at least one actuator; an input-output interface; and a peripheral I/O storage for the storing of a configuration and of physical states of the plurality of configurable input-output pins, in which the method comprises the following: generating of a sensor record in the peripheral I/O storage based on a physical state of an input-output pin associated with the at least one sensor; controlling of a physical state of one of the input-output pins associated with the at least one actuator corresponding to an actuator record, present in the peripheral I/O storage, for the at least one actuator; reading of the sensor record of the peripheral I/O storage of the respective input-output entity by the central computing platform via the serial communication bus; calculating of an actuator response based on the sensor information by the application software on the central computing platform, and writing of the actuator record in the peripheral I/O state table of the respective input-output entity by the central computing platform via the serial communication bus.

With such a method the same advantages can be achieved as with the above-described control arrangement.

In particular, an intermeshing in the electrical system can be reduced, or even completely eliminated, thereby enabling the manufacture of an automated wiring harness. Here the input-output entities can simultaneously function as power distributors and reduce the complexity of the wiring system. With the method, a very short latency time, i.e., in the nanosecond range, can be provided in the communication between the different electrical system components, making the electrical system suitable for the real-time control standards of autonomous driving and other applications.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The Figures are merely schematic representations and serve only the purpose of describing the present disclosure. Identical or functionally identical elements are provided throughout with the same reference numbers.

Figure 1:
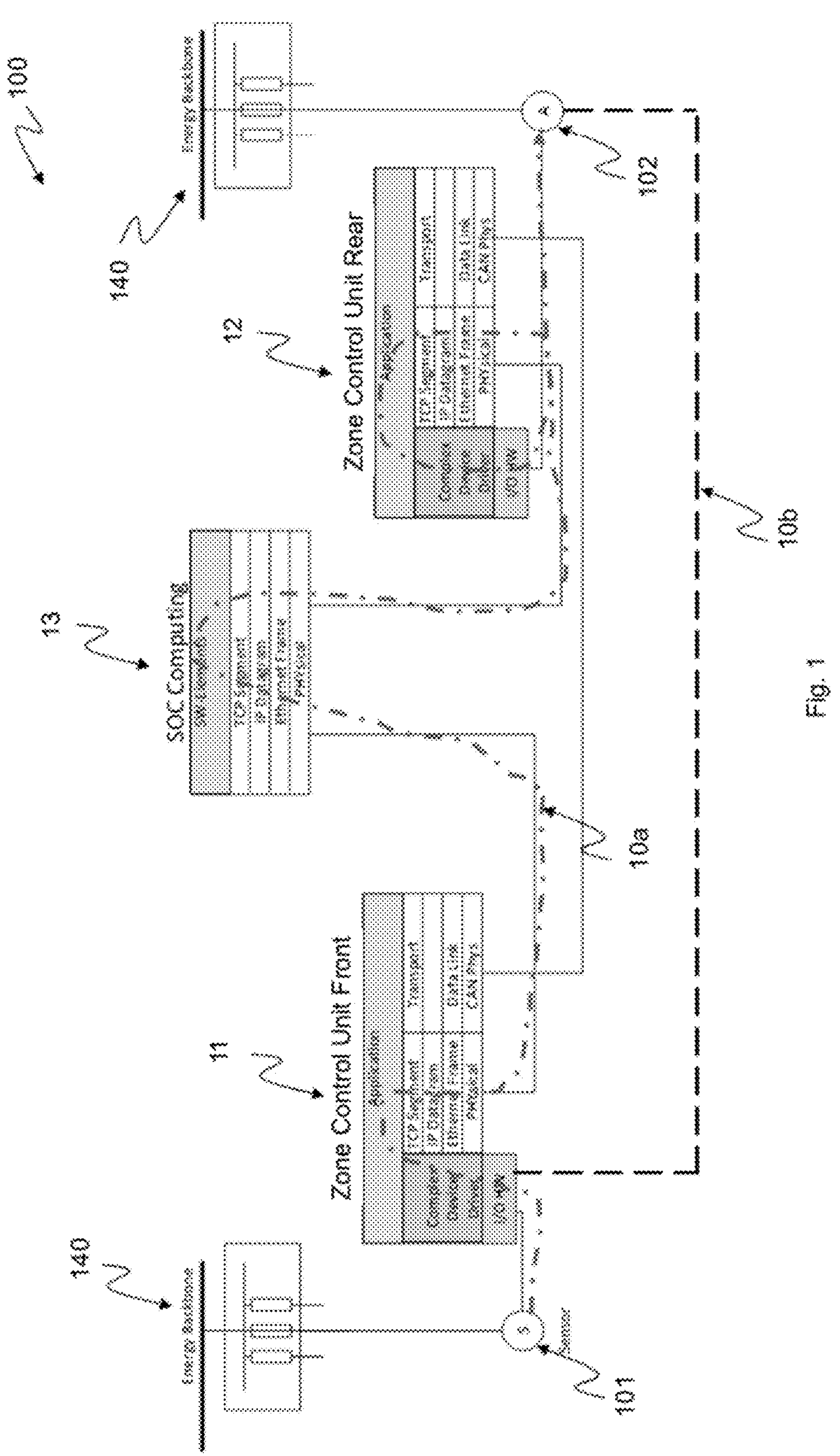
FIG. 1 shows a schematic representation of the construction of a conventional vehicle electrical system with zonal control units.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following detailed description, reference is made to the accompanying drawings, which form part of the description and illustrate specific potential examples of the present disclosure. It is understood that other examples can also be used, and structural or logical changes can also be undertaken without deviating from the concept of the present disclosure. The following detailed description is therefore not to be understood in a limiting sense. Furthermore, it is understood that the features of the different examples described herein can be combined with one another unless specifically indicated otherwise.

The aspects and examples are described with reference to the drawings, in which identical reference numbers generally refer to identical elements. In the following description, for the purpose of explanation, numerous specific details are presented in order to convey a detailed understanding of one or more aspects of the present disclosure. However, for a person skilled in the art it can be obvious that one or more aspects or examples of the present disclosure can be realized without incorporating all of the specific details. In other instances, known structures and elements are depicted in schematic form in order to facilitate the description of one or more aspects or examples. It is understood that other designs can be used, and structural or logical changes can be undertaken without deviating from the concept of the present disclosure.

FIG. 1 shows a schematic representation of the construction of a conventional vehicle electrical system 100 with zonal control units 11, 12 or zone integration modules 11, 12.

With the zonal control units 11, 12 the function to be controlled, for example the central locking, is distributed throughout the entire vehicle. If the shortest-possible connection between the sensors 101 and actuators 102 is wanted, a sensor 101, for example, is connected at the front zone control unit 11, and an actuator 102 is connected at the rear zone control unit 12.

In FIG. 1 the path 10*a* of the signals through the layers of the communication stack and operating-system layers is depicted. The multiple passage through these layers comes at the cost of the realizable latency time.

Functions with real-time standards are therefore still centrally networked, as depicted by way of example in the signal path 10*b*. Functions such as the central locking in so-called zonal wiring systems are therefore still implemented centrally in a control unit (here, for example, in the front zone control unit 11).

The majority of functions in the vehicle are not of a zonal nature. Thus, for example, the car access system, the airbag, and autonomous driving functions are each centrally networked with central control units for these functions. A front zonal control unit 11, for example, that receives a sensor signal from the front left, communicates it via a bus system to a rear zonal control unit 12, said unit then initiating an actuator signal there, is generally not possible, at least for (real-time) controlling with standards of short latency times.

Figure 2:
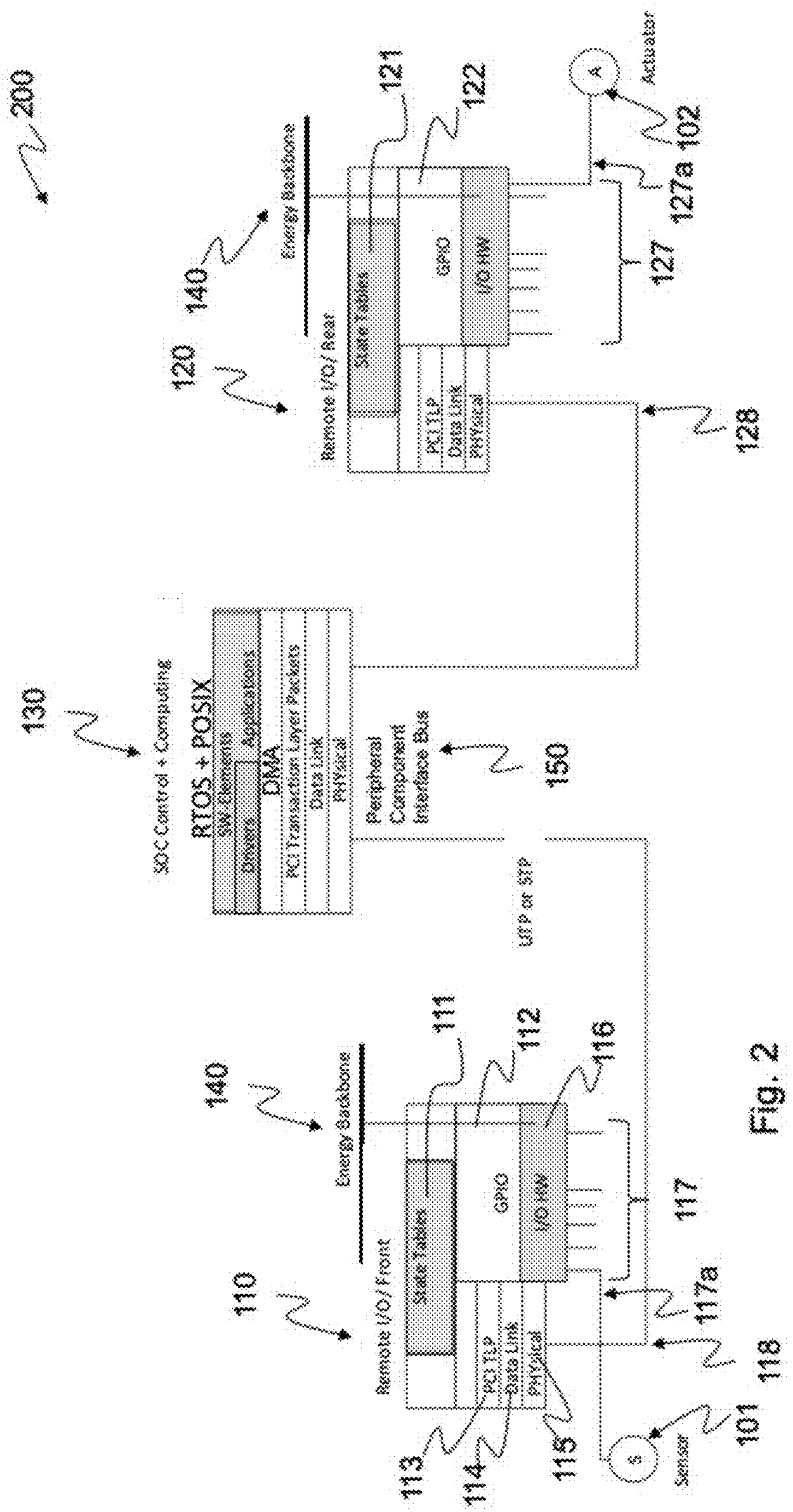
FIG. 2 shows a schematic representation of a control arrangement for a vehicle electrical system according to a first example of the present disclosure.

FIG. 2 shows a schematic representation of a control arrangement 200 for a vehicle electrical system according to a first example of the present disclosure.

FIG. 2 shows the software-technical implementation of the function is affected on a central microprocessor or computing platform 130, hereafter also referred to as central computing platform 130. In contrast to microcontrollers, microprocessors have no GPIO. Here SOC is a system-on-chip with a plurality of microprocessors. The physical connection of the sensors 101 actuators 102 via hardware drivers, which in turn are connected by GPIO (general purpose I/O), is affected in decentralized remote I/O modules 110, 120, in the following also referred to as decentralized input-output entities 110, 120.

The remote I/O modules 110, 120 are connected via a serial communication bus 150 or peripheral component interface bus (PCI express). The software drivers for the I/O hardware drivers are also located on the central computing platform 130 or SOC control unit. The serial communication bus 150 is configured to produce a serial point-to-point communication via a peripheral component interconnect bus.

In a write cycle, the digital states as output of the software drivers are transmitted via serial communication bus 150 or PCI express into the state table output in storage 121 of the remote I/O module 120. From there, they are cyclically transmitted to the GPIO 122 where they are converted to physical states (on, off, analog value, Tx, Rx.).

In the other direction, sensor data is subjected, for example, to an ADC conversion by the GPIO 112 of the remote I/O module 110, and the result stored in the state table input of the storage 111, and from there cyclically read via serial communication bus 150 or the PCI express by the central computing platform 130 or the SOC. With PCIes of generation 3 with up to 8 Gbit/s data rates, latency times in the nanosecond range can thus be implemented. These latency times are sufficient for functions with real-time standards.

In the depiction in FIG. 2, the remote I/O module front 110 is connected to a sensor 101, and the remote I/O module rear 120 is connected to an actuator 120. This is only an example for easier understandability. Of course, the remote I/O module front 110 can also be connected on one or more actuators and/or multiple sensors. The same applies to the remote I/O module rear 120, which can also be connected to one or more sensors and/or multiple actuators.

The remote I/O modules 110, 120 can now be optimally located in the vehicle; the control system 200, hereafter also referred to as control arrangement 200, can thus be viewed as a virtually distributed control system in the vehicle.

The remote I/O modules 110, 120 can also assume the function of local power distributors; thus they also supply the sensors 101 and actuators 102 with secured terminal voltage. These two functions allow a reduction in complexity in the physical wiring system.

The physical communication of the serial communication bus 150 is affected, for example, via an unshielded twisted-pair cable with PCI express on HDBaseT PHYs or via two shielded twisted pair cables (each a pair for Rx, Tx) with transmission of the original PCIe via re-timer or re-driver transceiver.

The advantage of the PCIe transmission in contrast to the Ethernet transmission is the error correction already existing in layer 2, the data link layer, rather than in higher layers, as with Ethernet IP. Ethernet IP is accordingly better suited for the data backbone connection between computing platforms; in contrast, PCIe is suitable for the (real-time) connection of peripherals.

In principle, however, Ethernet or USB bus systems can be used alternatively to PCIe. To this end, it is useful to implement a connection on the lower communication layers and to omit the protocol of the upper layers for message-based (addressed) communication. A direct-storage, access improved, hardware-adjacent data link is therefore used.

The control arrangement 200 comprises a central computing platform 130 and a plurality of decentralized input-output entities 110, 120 that are connected with the central computing platform 130 via a serial communication bus 150.

Here each input-output entity or module 110, 120 comprises: a plurality of configurable input-output pins 117 that are associated with at least one sensor 101 and/or at least one actuator 102; an GPIO input-output interface 112; and a peripheral I/O storage 111 for storing a configuration and a physical state of the plurality of configurable input-output pins 117.

The GPIO input-output interface 112 is configured to generate a sensor record in the peripheral I/O storage 111 based on a physical state of an input-output pin 117*a* associated with the at least one sensor 101.

The GPIO input-output interface 112 is also configured to control a physical state of one of the input-output pins, associated with the at least one actuator, corresponding to an actuator record, present in the peripheral I/O storage, for the at least one actuator.

As already described above, in the representation in FIG. 2 the decentralized input-output entity or the remote I/O module front 110 is connected to a sensor 101, and the decentralized input-output entities 120 or the remote I/O module rear 120 are connected to an actuator 102. This is only an example to facilitate understandability. The decentralized input-output entity 110 can also be connected to one or more actuators 102 or one or more sensors 101. The same applies for the decentralized input-output module or entity 110, 120 that can also be connected to one or more sensors and/or multiple actuators. The central computing platform 130 is configured to compare the central I/O storage 111*b* with the peripheral I/O storage 111 of the plurality of decentralized input-output entities 110 via a serial point-to-point interface and direct storage access mechanisms.

Via the serial communication bus 150, the central computing platform 130 can read the sensor record in the peripheral I/O storage 111 of the respective input-output entity 110, 120, and/or write the actuator record in the peripheral I/O storage 111 of the respective input-output entity 110, 120.

The central computing platform 130 can include a DMA interface 133 for the direct memory access on the peripheral I/O storage 111 of the respective input-output entity 110, 120, as depicted in FIG. 2.

The serial communication bus 150 can include a PCI express bus, as described above. Alternatively, the serial communication bus 150 can be provided for an Ethernet or Ethernet over IP communication, or it can be configured as a USB bus.

The plurality of decentralized input-output entities 110, 120 can be connected with the central computing platform 130, for example via an unshielded twisted-pair cable or via two shielded twisted-pair cables.

The GPIO input-output interface 112 can be configured to cyclically transmit storage states of the actuator records present in the peripheral I/O storage 111 onto the physical states of the input-output pins 127*a* corresponding to the actuator records.

The plurality of configurable input-output pins 117 can be configured, for example, as binary inputs/outputs, ADC inputs, DAC outputs, SPI inputs/outputs, and/or RX/TX inputs/outputs.

The GPIO input-output interface 112 can convert the sensor data recorded from the input-output pin 117*a*, associated with the at least one sensor 101, into a digital value, and store the digital value as sensor record in the peripheral I/O storage 111.

The GPIO input-output interface 112 can be designed to configure, according to the configuration present in the peripheral I/O storage 111, a dedicated input-output pin 127*a* as binary output pin, and to control a physical state of the dedicated input-output pin 127*a* corresponding to the actuator record present in the peripheral I/O storage 111.

The peripheral I/O storage 111 can comprise a storage region in which prescribed actuator records for the controlling of a safe state of the at least one actuator 102 are stored.

In the event of an interruption of the connection to the central computing platform 130, the GPIO input-output interface 112 can configure, based on the prescribed actuator records in the peripheral I/O storage 111, a physical state of the input-output pin 127*a*, associated with the at least one actuator 102, which puts the at least one actuator 102 into a safe state.

The GPIO input-output interface 112 can connect at least one of the input-output pins 127*a*, associated with at least one actuator 102, and or at least one of the input-output pins 117 associated with at least one sensor 101, to a battery terminal 140 in order to supply the at least one actuator 102 and/or the at least one sensor 101 with power.

The central computing platform 130 can be configured to repeatedly transmit the actuator record for a prescribed actuator to the corresponding input-output entity 110, 120 and to store it at multiple storage locations of the storage 111 for I/O state tables of the corresponding input-output entity 110, 120.

The GPIO input-output interface 112 can be configured to control the input-output pin 127 associated with the prescribed actuator based on a majority decision regarding the actuator records stored at the multiple storage locations.

The GPIO input-output interface 112 can be configured to control the input-output pin 127*a* associated with the prescribed actuator 102 based on the actuator record that is present in the majority of the multiple storage locations.

As can be seen in FIG. 2, a first input-output entity 110 and a sensor 101 connected with or associated with the first input-output entity is disposed, for example, in a front part of the vehicle. A second input-output entity 120 and an actuator 102 connected with or associated with the second input-output entity 120 are disposed in a rear part of the vehicle.

The central computing platform 130 can be configured to transmit the sensor record and/or the actuator record using a communication protocol that includes an error correction in a second communication layer.

Figure 3:
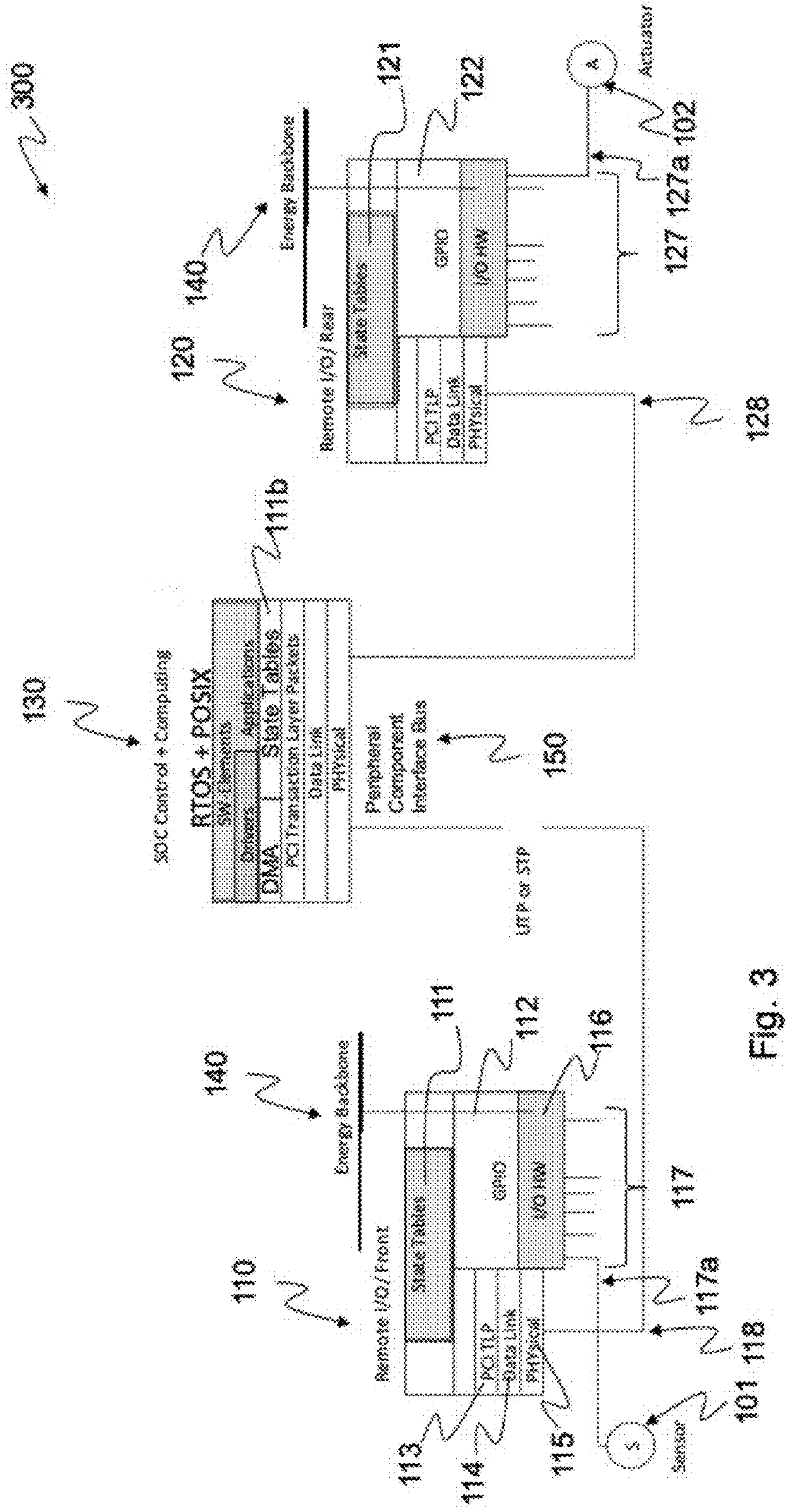
FIG. 3 shows a schematic representation of a control arrangement for a vehicle electrical system according to a second example of the present disclosure.

FIG. 3 shows a schematic representation of a control arrangement 300 for a vehicle electrical system according to a second example.

The control arrangement 300 corresponds to the control arrangement 200 described above for FIG. 2, with the difference that in the central computing platform, storage is provided for memory-mapped I/O.

The central computing platform 130 thus includes a central storage with an I/O state table in storage 111*b* that are configured to store the sensor records and actuator records of the I/O state tables in storage 111 of the plurality of decentralized input-output modules or entities 110, 120.

The central computing platform 130 is configured to cyclically compare the central I/O state table in storage 111*b* with the peripheral I/O state tables in storage 111 of the plurality of decentralized input-output modules or entities 110, 120 via the DMA interface 133.

A mirroring of the I/O states of the decentralized input-output modules or entities 110, 120 to the central computing platform 130 can thus be undertaken, which results in additional security against issues.

Figure 4:
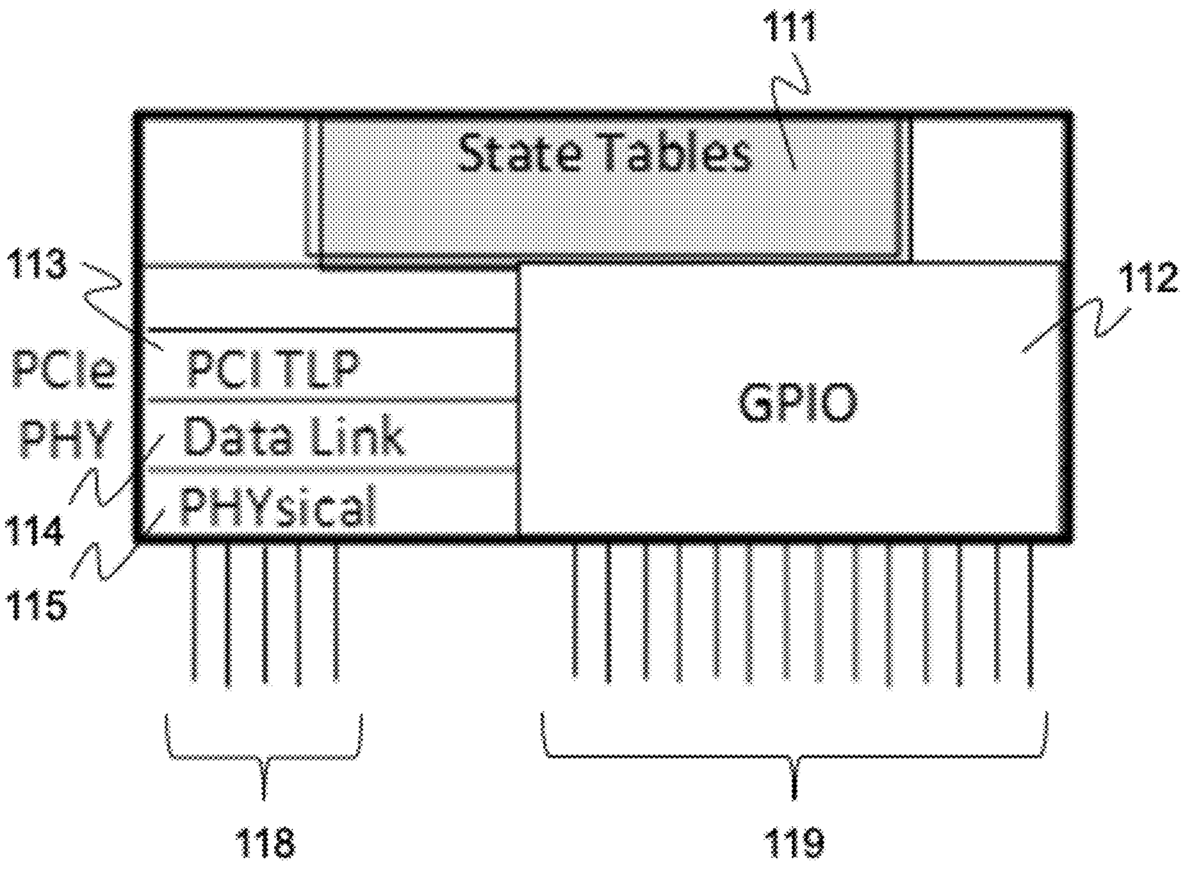
FIG. 4 shows a schematic representation of a decentralized input-output entity of a control arrangement for a vehicle electrical system according to one example of the present disclosure.

FIG. 4 shows a schematic representation of the ASIC, a decentralized input-output entity of a control arrangement 200, 300 for a vehicle electrical system 100 according to an example.

FIG. 4 shows a detailed representation of the core component for the remote I/O entity 110, 120 according to FIGS. 2 and 3. It is an ASIC ("application-specific integrated circuit"), which includes a PCIe PHY 115 and a storage 111 for state tables. The central computing platform 130, as depicted in FIGS. 2 and 3, obtains, via the PCIe 118, which is directly connected with the PCIe bus 150, direct read-write access to this storage 111.

Starting from this storage 111, the states are cyclically transmitted from the ASIC to the GPIO 112. The GPIO 112 is a GPIO as known from classical automotive controllers. These contain binary inputs/outputs, ADC inputs, DAC outputs, SPI, RX/TX, for example for local buses such as CAN or LIN or Ethernet 10BaseT. The configuration of the individual pins 117 is stored in a configuration table.

Additional states can be stored in tables, such as, for example, safe states in the event of an interruption in communication. In order to meet the standards for functional safety, error correction occurs on data link 114 and PCI TLP layer 113 (for example "cyclic redundancy check"-CRC for short).

Signals can also be received three times and stored in three tables for comparison. The GPIO 112 then implements the states that have been identically stored at least twice. Furthermore, functions for security can be implemented in this ASIC.

The functionality of the above-depicted decentralized input-output module or entity 110, 120 is described in general terms below.

The input-output module or entity 110, 120 comprises a plurality of configurable input-output pins 119, input-output circuitry 116 with HW drivers or sensor interfaces that are connectable with at least one sensor 101 and/or at least one actuator 102, a configurable input-output GPIO 112; and a peripheral I/O storage 111 for the storage of a configuration and of physical states of the plurality of configurable input-output pins 117.

The input-output GPIO 112 is designed to configure an input-output pin 119, connectable with the input-output circuitry 116 to record sensor data of the at least one sensor, and, based on the sensor data, to generate a sensor record in the peripheral I/O storage 111.

The input-output GPIO 112 is also designed, based on a record present in the peripheral I/O storage 111, to configure the GPIO pin 119 (e.g., as binary output) and to set a physical state, corresponding to the peripheral I/O state table in the storage 111, for the at least one actuator 102.

The central computing platform 130 is configured to read, via the serial communication bus 150, the sensor record in the peripheral I/O storage 111 of the respective input-output module or entity 110, 120, and/or to write, via the serial communication bus 150, the actuator record in the I/O state table in the storage 111 of the respective input-output module or entity 110, 120.

Via the serial communication bus 150, which is connected to the PCIe 118 pin, depicted in FIG. 4, of the PCIe PHY 115 of the communication protocol (e.g., PCI express), the central computing platform 130 can read the sensor record in the peripheral I/O storage 111 of the respective input-output module or entity 110, 120, and/or write the actuator record in the peripheral I/O storage 111 of the respective input-output module or entity 110, 120.

Figure 5:
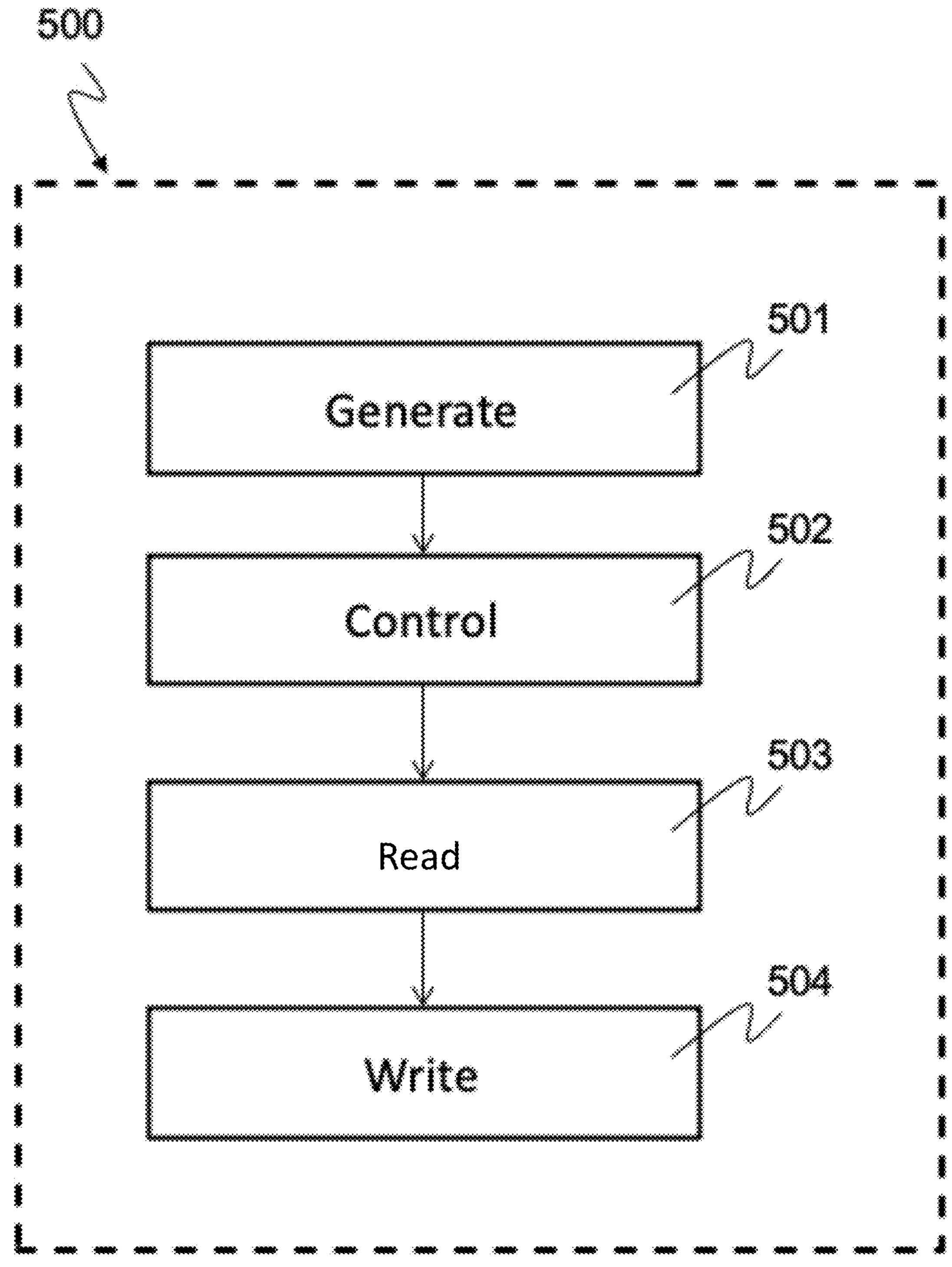
FIG. 5 shows a schematic representation of a method for the controlling of sensors and actuators in a vehicle electrical system according to the present disclosure.

FIG. 5 shows a schematic representation of a method 500 for the controlling of sensors and actuators in a vehicle wiring system.

Such a vehicle wiring system comprises a control arrangement 200, 300 as described above for FIGS. 2 and 3. That is, the control arrangement 200, 300 comprises a central computing platform 130 and a plurality of decentralized input-output entities 110, 120 that are connected with the central computing platform 130 via a serial communication bus. Each input-output entity 110, 120 comprises: a plurality of input-output pins 119 that are associated via an input-output circuitry 116 with at least one sensor 101 and/or at least one actuator 102; a configurable GPIO input-output interface 112; and a peripheral I/O storage 111 for the storing of a configuration and of physical states of the plurality of configurable input-output pins 119.

The method 500 includes the following:

A generation 501 of a sensor input in the peripheral I/O storage 111 based on a physical state of an input-output pin 117*a* associated with the at least one sensor 101; control 502 of a physical state of an input-output pin 127*a*, associated with the at least one actuator 102, corresponding to an actuator record, present in the peripheral I/O storage 111, for the at least one actuator 102; reading 503 of the sensor record in the peripheral I/O storage 111 of the respective input-output entity 110, 120 by the central computing platform 130 via the serial communication bus 150; and/or writing 504 of the actuator record in the peripheral I/O storage 111 of the respective input-output entity 110, 120 by the central computing platform 130 via the serial communication bus 150.

The above-described configurable GPIO input-output interface 112 or GPIO 112 comprises the following functionality:

Pins of the GPIO can (typically once during the initialization) be configured. During configuration it is selected whether the pin is a binary input (voltage present or not present), a binary output, an analog input (measured signal 0 to 3.2 V, for example), also ADC or an analog output DAC. Furthermore, it can also be configured as RX (receive) or Tx (send) of a serial bus such as CAN.

Once configured, the pin configured as output will assume the physical states according to the I/O state table. A pin configured as input will convert the physical states applied into digital information and write them in the I/O state table.

The GPIO does not directly control the sensors/actors. There is still a circuit with HW drivers or smart FETs, sensor amplifiers, etc., between them.

In addition, a computer program can be provided with a computer code for implementing the method 500 on a control system, for example, on the above-described control arrangement.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A control arrangement for a vehicle electrical system, comprising:

a central computing platform; and a plurality of decentralized input-output modules that are connected with the central computing platform via a serial communication bus, with the plurality of decentralized input-output modules including:

a first input-output module of the plurality of decentralized input-output modules that includes a plurality of first configurable input-output pins that are associated with a sensor a first input-output interface, and a first peripheral input/output (I/O) storage configured to store a configuration and physical states of the plurality of first configurable input-output pins, wherein the first input-output interface is configured to generate a sensor record in the peripheral I/O storage based on a physical state of one of the plurality of first configurable input-output pins associated with the sensor, a second input-output module of the plurality of decentralized input-output modules that includes a plurality of second configurable input-output pins that are associated with an actuator, a second input-output interface, and a second peripheral input/output (I/O) storage configured to store a configuration and physical states of the plurality of second configurable input-output pins, wherein the second input-output interface is configured to control a physical state of one of the plurality of second configurable input-output pins associated with the actuator that corresponds to an actuator entry, present in the second peripheral I/O storage, for the actuator, and the central computing platform, via the serial communication bus, is configured to read the sensor record in the first peripheral I/O storage of the first input-output module, and write an actuator record in the second peripheral I/O storage of the second input-output module.

2. The control arrangement according to claim 1, wherein the central computing platform includes a DMA interface for direct memory access to a respective one of the first input-output module and the second input-output module of the plurality of decentralized input-output modules.

3. The control arrangement according to claim 2, wherein the central computing platform includes a central I/O storage configured to store the sensor record of the first peripheral I/O storage and the actuator record of the second peripheral I/O storage and the central computing platform is configured to compare the central I/O storage with the first peripheral I/O storage and the second peripheral I/O storage via a serial point-to-point interface and direct storage access mechanisms.

4. The control arrangement according to claim 1, wherein the serial communication bus is configured to produce a serial point-to-point communication via a peripheral component interconnect bus.

5. The control arrangement according to claim 1, wherein the plurality of decentralized input-output modules are connected with the central computing platform via an unshielded twisted-pair cable.

6. The control arrangement according to claim 1, wherein the plurality of decentralized input-output modules are connected with the central computing platform via two shielded twisted-pair cables.

7. The control arrangement according to claim 1, wherein the second input-output interface is configured to cyclically transmit storage states of at least one actuator input present in the second peripheral I/O storage to physical states of the plurality of second configurable input-output pins corresponding to the at least one actuator input.

8. The control arrangement according to claim 1, wherein the plurality of first configurable input-output pins are at least one of binary inputs/outputs, ADC inputs, DAC outputs, SPI inputs/outputs, and RX/TX inputs/outputs.

9. The control arrangement according to claim 1, wherein the first input-output interface is configured to convert the sensor record received from the one of the plurality of first configurable input-output pins associated with the sensor into a digital value, and to store the digital value as a sensor input in the first peripheral I/O storage.

10. The control arrangement according to claim 1, wherein the second input-output interface is configured to configure a dedicated input-output pin, according to the configuration present in the second peripheral I/O storage, as a binary output pin, and to control a physical state of the dedicated input-output pin according to the actuator record present in the second peripheral I/O storage.

11. The control arrangement according to claim 1, wherein the second peripheral I/O storage further comprises a storage region in which the actuator record to control a safe state of the actuator is stored.

12. A method for controlling of sensors and actuators in a vehicle electrical system with a control arrangement, the method comprising:

connecting a decentralized first input-output module with a central computing platform of the control arrangement via a serial communication bus, with the first input-output module comprising a plurality of first configurable input-output pins that are associated with a sensor, a first input-output interface and a first peripheral I/O storage configured to store a configuration of physical state data of the plurality of first configurable input-output pins;

connecting a decentralized second input-output module with a central computing platform of the control arrangement via a serial communication bus, with the second input-output module comprising a plurality of second configurable input-output pins that are associated with an actuator, a second input-output interface and a second peripheral I/O storage configured to store a configuration of physical state data of the plurality of second configurable input-output pins;

generating a sensor input in the first peripheral I/O storage based on a physical state of one input-output pin of the plurality of first configurable input-output pins associated with the sensor;

controlling a physical state of one input-output pin of the plurality of second configurable input-output pins associated with the actuator, corresponding to an actuator record, present in the second peripheral I/O storage, for the actuator;

performing:

reading a sensor record in the first peripheral I/O storage of the first input-output module by the central computing platform via the serial communication bus; and writing the actuator record in the second peripheral I/O storage of the second input-output module by the central computing platform via the serial communication bus.

* * * * *